(12) United States Patent
Kobayashi et al.

(10) Patent No.: US 8,312,730 B2
(45) Date of Patent: Nov. 20, 2012

(54) MAGNETIC REFRIGERATION DEVICE AND MAGNETIC REFRIGERATION SYSTEM

(75) Inventors: Tadahiko Kobayashi, Kanagawa (JP); Akiko Saito, Kanagawa (JP); Shiori Kaji, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 832 days.

(21) Appl. No.: 12/396,043

(22) Filed: Mar. 2, 2009

(65) Prior Publication Data

US 2009/0217675 A1 Sep. 3, 2009

(30) Foreign Application Priority Data

Mar. 3, 2008 (JP) .................................. 2008-051645

(51) Int. Cl.
*F25D 17/02* (2006.01)
*F25B 21/00* (2006.01)
(52) U.S. Cl. ............................................. 62/3.1; 62/118
(58) Field of Classification Search ...................... 62/3.1, 62/190, 467, 914
See application file for complete search history.

(56) References Cited

U.S. PATENT DOCUMENTS

| | | | |
|---|---|---|---|
| 3,414,698 A * | 12/1968 | Bedford et al. ............... | 219/630 |
| 4,332,135 A | 6/1982 | Barclay et al. | |
| 5,156,003 A | 10/1992 | Yoshiro et al. | |
| 5,687,614 A | 11/1997 | Hashimoto et al. | |
| 6,111,491 A | 8/2000 | Furuse et al. | |
| 6,526,759 B2 | 3/2003 | Zimm et al. | |
| 6,676,772 B2 | 1/2004 | Saito et al. | |
| 6,826,915 B2 | 12/2004 | Wada et al. | |
| 7,063,754 B2 | 6/2006 | Fukamichi et al. | |
| 7,168,255 B2 | 1/2007 | Saito et al. | |
| 7,536,866 B2 | 5/2009 | Kobayashi et al. | |
| 2006/0213580 A1 | 9/2006 | Tsuji et al. | |
| 2006/0218936 A1* | 10/2006 | Kobayashi et al. .............. | 62/3.1 |
| 2006/0254385 A1 | 11/2006 | Tsuji et al. | |
| 2007/0125095 A1 | 6/2007 | Iwasaki et al. | |

(Continued)

FOREIGN PATENT DOCUMENTS

JP 60-0117066 * 6/1985

(Continued)

OTHER PUBLICATIONS

Notification of Reason(s) for Refusal issued by the Japanese Patent Office on Feb. 2, 2010, for Japanese Patent Application No. 2008-051645, and English-language translation thereof.

(Continued)

*Primary Examiner* — Frantz Jules
*Assistant Examiner* — Henry Crenshaw
(74) *Attorney, Agent, or Firm* — Finnegan, Henderson, Farabow, Garrett & Dunner, L.L.P.

(57) ABSTRACT

A magnetic refrigeration device, which can be reduced in size and improve magnetic refrigeration efficiency, and a magnetic refrigeration system can be provided. The magnetic refrigeration device has a heat exchanger vessel of a helical structure filled with magnetic particles having a magnetocaloric effect, a magnetic circuit, a driving unit configured to relatively move the heat exchanger vessel and the magnetic circuit so that a magnetic field can be applied to and removed from the magnetic particles, a low temperature side heat exchanging unit, a high temperature side heat exchanging unit, a refrigerant flow device, and a refrigerant circuit formed by connecting the heat exchanger vessel, the low temperature side heat exchanging unit, the high temperature side heat exchanging unit, and the refrigerant flow device by a pipe for circulating a refrigerant. The magnetic refrigeration system is arranged to use the magnetic refrigeration device.

18 Claims, 11 Drawing Sheets

U.S. PATENT DOCUMENTS

| | | |
|---|---|---|
| 2007/0199332 A1* | 8/2007 | Muller et al. .................... 62/3.1 |
| 2007/0220901 A1 | 9/2007 | Kobayashi et al. |
| 2007/0240428 A1 | 10/2007 | Koga et al. |
| 2007/0241305 A1 | 10/2007 | Sakurada et al. |
| 2008/0078184 A1 | 4/2008 | Saito et al. |
| 2008/0216484 A1 | 9/2008 | Tsuji et al. |
| 2008/0236171 A1 | 10/2008 | Saito et al. |
| 2009/0071572 A1 | 3/2009 | Fujita et al. |

FOREIGN PATENT DOCUMENTS

| | | | |
|---|---|---|---|
| JP | 60-117066 | | 6/1985 |
| JP | 60117066 | * | 6/1985 |
| JP | 4-177065 | | 6/1992 |
| JP | 7-280060 | | 10/1995 |
| JP | 11-31615 | | 2/1999 |
| JP | 2000-234880 | | 8/2000 |
| JP | 2003-28532 | | 1/2003 |
| JP | 2006-283987 | | 10/2006 |
| JP | 2007-155269 | | 6/2007 |

OTHER PUBLICATIONS

Kaji et al., "Magnetic Material for Magnetic Refrigeration Apparatus, AMR Bed, and Magnetic Refrigeration Apparatus", U.S. Appl. No. 12/393,849, filed Feb. 26, 2009.

* cited by examiner

Removal of Magnetic Field (0 degree)

Application of Magnetic Field (180 degrees)

0 degree 90 degrees 180 degrees 270 degrees

MAGNETIC REFRIGERATION DEVICE AND MAGNETIC REFRIGERATION SYSTEM

CROSS-REFERENCE TO RELATED APPLICATION

This application is based upon and claims the benefit of priority from Japanese Patent Applications No. 2008-051645, filed on Mar. 3, 2008, the entire contents of which are incorporated herein by reference.

FIELD OF THE INVENTION

The present invention relates to a magnetic refrigeration device using a magnetic material having a magnetocaloric effect and to a magnetic refrigeration system.

BACKGROUND OF THE INVENTION

At present, a refrigeration technology in a room temperature region which closely relates to a human daily life, for example, a refrigerator, a freezer, a room air conditioner, and the like, mainly employs a gas compression/expansion cycle. However, a serious problem of environmental destruction is caused by specific freon gases discharged into the environment as to the refrigeration technology based on the gas compression/expansion cycle. Further, CFC substitutes also have a problem of an adverse affect to the environment. To cope with the above problems, the refrigeration technology is recently improved using a natural refrigerant ($CO_2$ and the like) and isobutane. It is required from the above background to practically use a refrigeration technology which does not cause the problem of environmental destruction due to discharge of working gases, is clean, and has high efficiency.

Recently, an expectation is increased to a magnetic refrigeration technology as one of the refrigeration technologies which take environment into consideration and have high efficiency. And a magnetic refrigeration technology in a room temperature region is actively researched and developed. A magnetocaloric effect in iron (Fe) was discovered. The magnetocaloric effect is such a phenomenon that when an external magnetic field applied to a magnetic material is changed in an adiabatic state, the temperature of the magnetic material is changed.

In magnetic refrigeration, a low temperature is created making use of the magnetocaloric effect as described below. In a magnetic material, entropy is changed between a state in which a magnetic field is applied thereto and a state in which the magnetic field is removed therefrom due to the difference between the degrees of freedom of an electromagnetic spin system. When the entropy is changed, the entropy migrates between the electron spin system and a lattice system. The magnetic refrigeration uses a magnetic material having a large electron spin. A low temperature is created by transmitting entropy between the electron spin system and the lattice system making use of a large amount of change of the entropy between when the magnetic field is applied and when the magnetic field is removed.

A refrigeration device for a magnetic refrigeration system was developed using paramagnetic salts such as $Gd_2(SO_4)_3 \cdot 8H_2O$ and the like and paramagnetic compounds represented by $Gd_3Ga_5O_{12}$ (gadolinium gallium garnet; GGG) acting as magnetic refrigeration materials having a magnetocaloric effect. In the refrigeration device for realizing the magnetic refrigeration using paramagnetic materials is mainly applied to low temperature region of 20 K or less, and a magnetic field of about 10 tesla, which can be obtained using a superconducting magnet, is used.

In contrast, to realize magnetic refrigeration at a higher temperature, magnetic refrigeration making use of magnetic phase transition between a paramagnetic state and a ferromagnetic state of a ferromagnetic material has been actively studied. There are proposed many magnetic materials including rare earths having a large electron spin per unit volume such as rare earth element simple substances of a lanthanoide rare earth elements such as Pr, Nd, Dy, Er, Tm, Gd, and the like, at least two kinds of rare earth alloy materials such as Gd—Y, Gd—Dy, rare earth intermetallic compounds such as $RAl_2$(R represents rare earth elements, which is the same in the following description), $RNi_2$, GdPd, and the like.

Magnetic refrigeration in a room temperature region was realized using a ferromagnetic material Gd having a ferromagnetic phase transition temperature (Tc) of about 294 K. However, it was difficult to achieve a steady state although a refrigerating cycle was continuously operated. There was an attempt to use the lattice entropy positively that had been regarded as an interference to magnetic refrigeration in the range of intermediate temperatures to room temperature (or a temperature range in which the lattice entropy is large relative to the magnetic entropy) and a method of refrigeration using the entropy was proposed (refer to U.S. Pat. No. 4,332,135). The magnetic refrigeration system is called an AMR system ("Active Magnetic Refrigeration"). A refrigeration device using these systems operates in a strong magnetic field using a superconducting magnet.

A prototype of a magnetic refrigeration device employing an AMR system using an AMR bed filled with fine spherical Gd was made and a continuous steady operation of a magnetic refrigeration cycle in a room temperature region was succeeded. It is reported that realizing refrigeration of about 30° C. by changing a magnetic field from 0 tesla to 5 tesla using a superconducting magnet in the room temperature region is succeeded and that when a refrigerant temperature difference ($\Delta T$) was 13° C., very high refrigeration efficiency (COP=15; however excluding power input to a magnetic field generation mean) was obtained. By the way, refrigeration efficiency (COP) of a home refrigerator and the like in a gas compression/expansion cycle using conventional chlorofluorocarbon is about 1 to 3.

There is an example of a magnetic refrigeration device employing an AMR system using a permanent magnet. This example consists of a turning AMR bed and a fixed magnetic circuit. A magnetic field produces the magnetic circuit in Air gap. It is proved that cooling of 1.5 K could be achieved in a room temperature region using Gd as a magnetic refrigeration material under the conditions of magnetic field: 0.3 T, refrigerant: olive oil, and wheel rotation rate: 4-50 rpm. However, the example is disadvantageous in that a complex structure for accommodating a refrigerant circulating unit in the rotating drive system and an insufficient cooling capability.

Thereafter, a room temperature magnetic refrigeration technology using a permanent magnet is actively developed. A magnetic field application/removal mean in the room temperature magnetic refrigeration technology is roughly classified to a rotating type and a reciprocating type. The rotary type is a system in which a magnet rotates with respect to a fixed magnetic refrigeration material. In contrast, the reciprocating type is a system for relatively reciprocating a magnetic circuit for generating a magnetic field and a magnetic refrigeration material by moving any one of them. A piping system becomes complex in the rotating type, and a magnetic delay occurs in correspondence to a moving stroke when a magnetic field is applied and removed in the reciprocating type.

SUMMARY OF THE INVENTION

A magnetic refrigeration device of an embodiment of the present invention has a heat exchanger vessel of a helical structure filled with magnetic particles having a magnetocaloric effect, a magnetic circuit, a driving unit configured to relatively move the heat exchanger vessel and the magnetic circuit so that a magnetic field can be applied to and removed from the magnetic particles, a low temperature side heat exchanging unit independent of the heat exchanger vessel, a high temperature side heat exchanging unit independent of the heat exchanger vessel, a refrigerant flow device, and a refrigerant circuit formed by connecting the heat exchanger vessel, the low temperature side heat exchanging unit, the high temperature side heat exchanging unit, and the refrigerant flow device by a pipe for circulating a refrigerant.

A magnetic refrigeration system of an embodiment of the present invention has a magnetic refrigeration device which, includes a heat exchanger vessel of a helical structure filled with magnetic particles having a magnetocaloric effect, a magnetic circuit, a driving unit configured to relatively move the heat exchanger vessel and the magnetic circuit so that a magnetic field can be applied to and removed from the magnetic particles, a low temperature side heat exchanging unit independent of the heat exchanger vessel, a high temperature side heat exchanging unit independent of the heat exchanger vessel, a refrigerant flow device, and a refrigerant circuit formed by connecting the heat exchanger vessel, the low temperature side heat exchanging unit, the high temperature side heat exchanging unit, and the refrigerant flow device by a pipe for circulating a refrigerant, a cooling unit thermally connected to the low temperature side heat exchanging unit, and a radiating unit thermally connected to the high temperature side heat exchanging unit.

According to embodiments of the present invention, a magnetic refrigeration device, which can be reduced in size and improve magnetic refrigeration efficiency, and a magnetic refrigeration system can be provided.

DETAILED DESCRIPTION OF THE EMBODIMENTS

It is assumed that the terms "helix" and "helical" used in the specification does not mean a two-dimensional curve (spiral) and means a three-dimensional curve (helical).

First Embodiment

A magnetic refrigeration device of a first embodiment has a heat exchanger vessel, which has a helical structure and is filled with magnetic particles having a magnetocaloric effect, and a magnetic circuit. The magnetic refrigeration device has a driving unit for causing the heat exchanger vessel and the magnetic circuit to move relatively so that a magnetic field can be applied to and removed from the magnetic particles. Further, the magnetic refrigeration device has a low temperature side heat exchanging unit independent from the heat exchanger vessel, a high temperature side heat exchanging unit independent from the heat exchanger vessel, and a refrigerant flow device. Then, the magnetic refrigeration device is formed by connecting the heat exchanger vessel, the low temperature side heat exchanging unit, the high temperature side heat exchanging unit, and the refrigerant flow device by a pipe and has a refrigerant circuit for circulating a refrigerant.

Figure 1A:
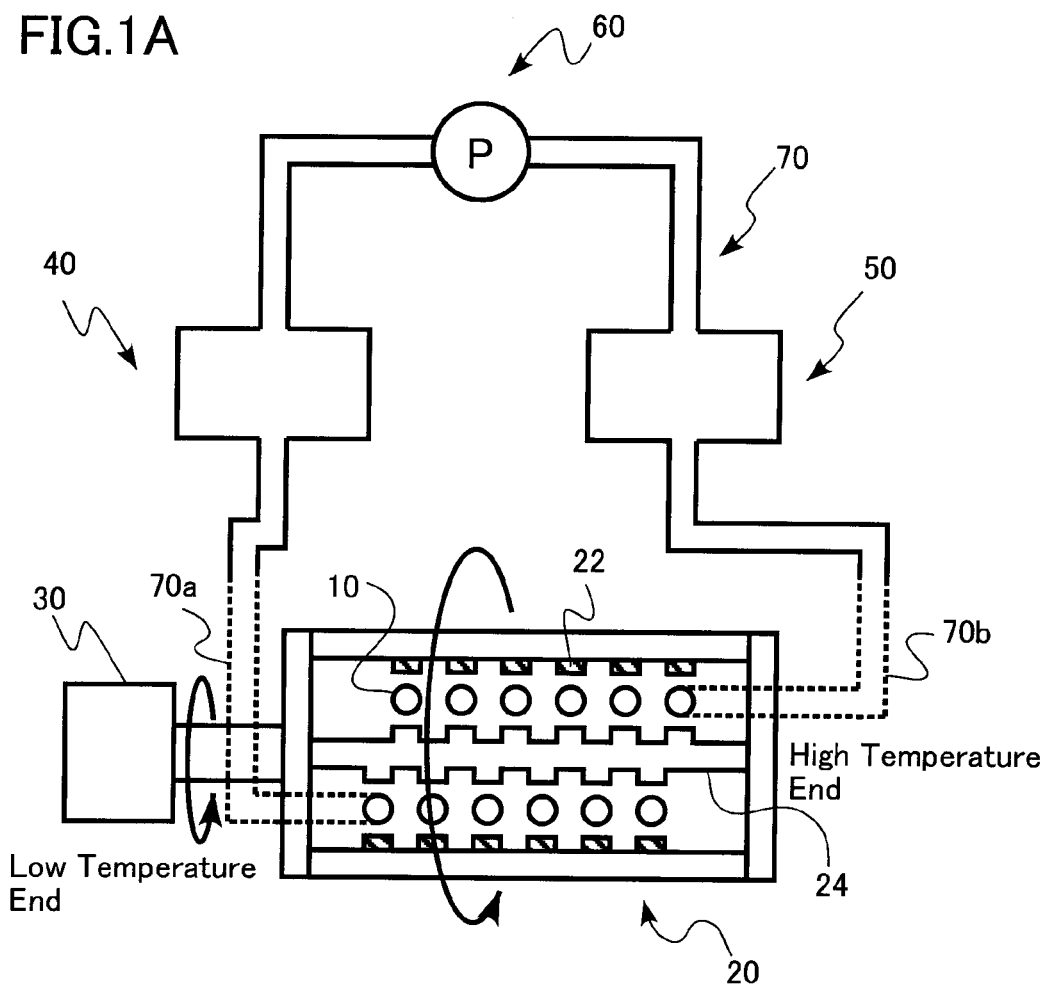
FIG. 1A is a structure sectional view of a magnetic refrigeration device of a first embodiment.
Figure 1B:
FIG. 1B is an outside appearance view of a heat exchanger vessel.
Figure 1C:
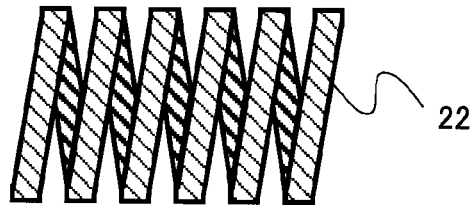
FIG. 1C is an outside appearance view of a permanent magnet which is a component of a magnetic circuit.

FIG. 1A is a structure sectional view of the magnetic refrigeration device of the first embodiment, FIG. 1B is an outside appearance view of the heat exchanger vessel, and FIG. 1C is an outside appearance view of a permanent magnet which is a component of the magnetic circuit. As shown in FIG. 1, the magnetic refrigeration device has the heat exchanger vessel 10 having the helical structure and filled with the magnetic particles (not shown) having the magnetocaloric effect and the magnetic circuit 20 which is disposed without coming into contact with the heat exchanger vessel 10. The magnetic refrigeration device has the driving unit 30 having a rotational motion mechanism which rotates the magnetic circuit 20 with respect to the heat exchanger vessel 10 to thereby relatively move them so that a magnetic field can be applied to and removed from the magnetic particles.

Further, the magnetic refrigeration device has the low temperature side heat exchanging unit 40 having a function for exchanging cold heat with the outside of the device and the high temperature side heat exchanging unit 50 having a function for exchanging hot heat with the outside of the device. In addition to the above, the magnetic refrigeration device has the refrigerant flow device 60 for causing the refrigerant to migrate. The heat exchanger vessel 10, the low temperature side heat exchanging unit 40, the high temperature side heat exchanging unit 50, and the refrigerant flow device 60 are connected by a pipe 70 in which the refrigerant, for example, water flows and form a refrigerant circuit in which the refrigerant circulates.

As shown in FIG. 1B, the heat exchanger vessel 10 has a hollow helical structure. The heat exchanger vessel 10 is filled with magnetic particles of, for example, Gd (gadolinium)

having the magnetocaloric effect in the inside thereof. The heat exchanger vessel 10 has such a structure that the refrigerant flows in and out from both the ends of the heat exchanger vessel 10 having the helical structure as shown by while arrows. As shown in FIG. 1A, the heat exchanger vessel 10 is connected to the low temperature side heat exchanging unit 40 by a low-temperature-end side pipe 70a of the heat exchanger vessel 10 having the helical structure and connected to the high temperature side heat exchanging unit 50 by a high-temperature-end side pipe 70b.

The magnetic circuit 20 has a permanent magnet 22 and a magnetic yoke 24. The permanent magnet 22 has a helical structure whose pitch is the same as that the heat exchanger vessel 10. A material of the permanent magnet 22 is not particularly limited, and a NdFeB magnet, a SmCo magnet, a ferrite magnet, and the like, for example, can be used. Further, an electromagnetic soft iron, for example, can be used as a material of the magnetic yoke 24.

The magnetic yoke 24 has helical convex portions which have the same pitch as that of the heat exchanger vessel 10 and the permanent magnet 22 and are disposed thereto in confrontation with the permanent magnet 22. Note that the magnetic yoke 24 may be composed of a permanent magnet. Although the helical convex portions are disposed from a view point of increasing the space magnetic flux density of a gap between the permanent magnet 22 and the magnetic yoke 24, the helical shape thereof is not necessarily indispensable, and a magnetic yoke without the helical convex portions can be applied.

An electric motor and a hydraulic motor, for example, are used for the driving unit 30 which is fixed to one end of the magnetic circuit 20 and has a function for rotating the magnetic circuit 20 in the direction of an arrow of FIG. 1A. Further, the low temperature side heat exchanging unit 40 is composed of, for example, a reservoir for reserving a low temperature refrigerant and a low temperature side heat exchanger vessel disposed in the reservoir to come into contact with the refrigerant. Likewise, the high temperature side heat exchanging unit 50 is composed of, for example, a reservoir for reserving a high temperature refrigerant and a high temperature side heat exchanger vessel disposed in the reservoir to come into contact with the refrigerant. The refrigerant flow device 60 is composed of, for example, a pump and a switching valve which switches the direction, in which the refrigerant flows, in synchronism with the application and the removal of the magnetic field to and from the magnetic particles.

Figure 2A:
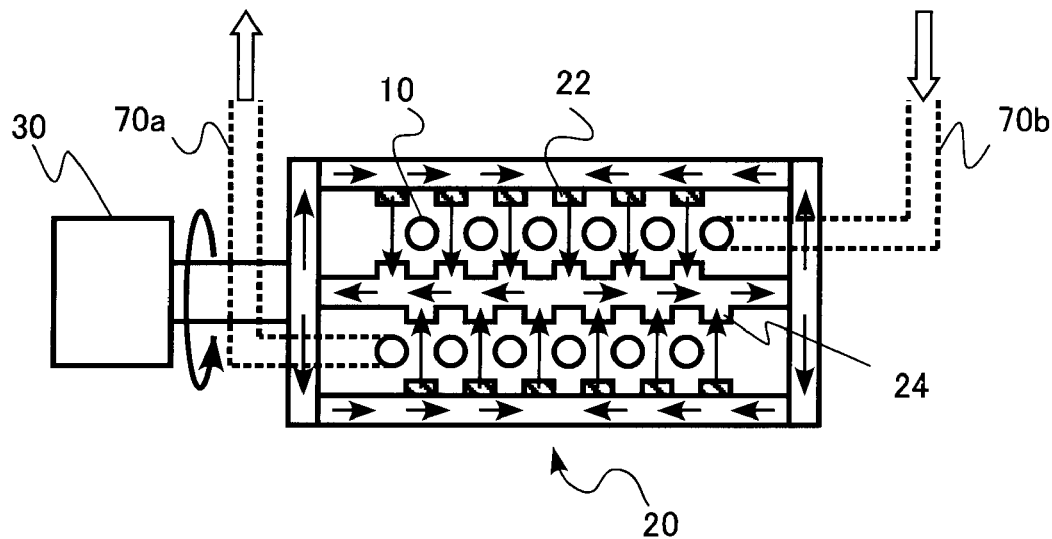
FIGS. 2A and 2B are sectional views of a main portion of the magnetic refrigeration device of the first embodiment.
Figure 2B:
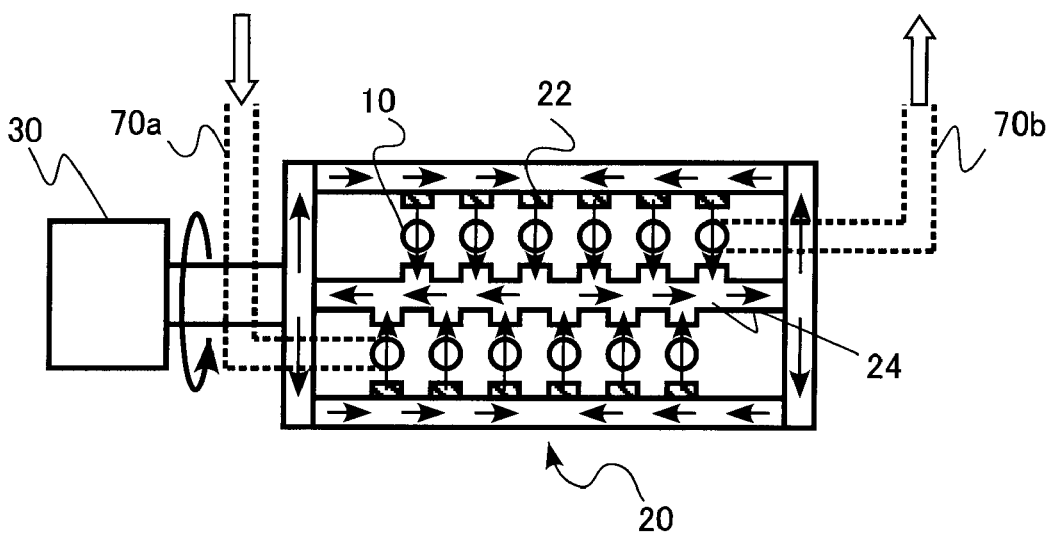
Figure 3:
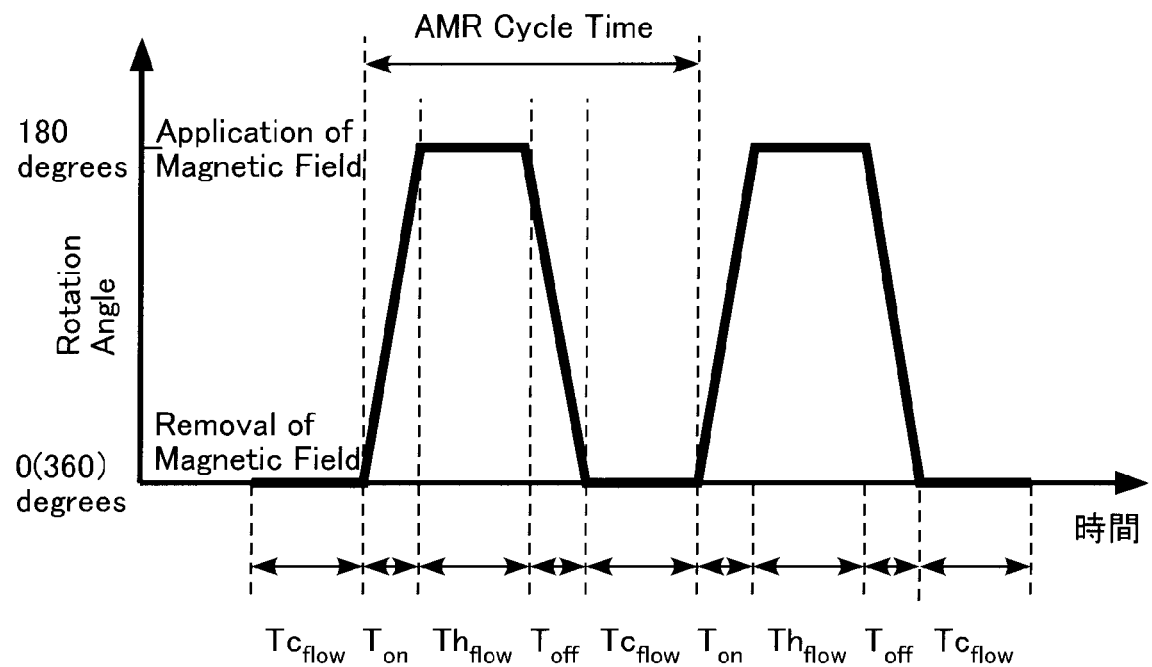
FIG. 3 is an AMR cycle chart of the magnetic refrigeration device of the first embodiment.

Next, an operating principle of the magnetic refrigeration device will be explained referring to FIGS. 1 to 3. FIGS. 2A and 2B are sectional views of a main portion of the magnetic refrigeration device. FIG. 2A is the sectional view of the main portion of the magnetic refrigeration device when the magnetic field is removed (rotation angle: 0° (degree)) and FIG. 2B is the sectional view of the main portion of the magnetic refrigeration device when the magnetic field is applied (rotation angle: 180° (degree)). Note that the rotation angle of a position when the magnetic field is removed is defined as 0° and the rotation angle of a position when the magnetic circuit moves around the periphery of the heat exchanger vessel once is defined as 360°. Further, in FIGS. 2A and 2B, the direction of a magnetic flux of the magnetic circuit is shown by black arrows. FIG. 3 is an AMR cycle chart of the magnetic refrigeration device. A lateral axis shows a time, and a vertical axis shows a rotation angle of the magnetic circuit with respect to the heat exchanger vessel.

First, in the case of FIG. 2A, i.e., when the rotation angle is 0°, the magnetic flux from the permanent magnet 22 to the magnetic yoke 24 does not traverse the heat exchanger vessel 10 as shown in the figure. Accordingly, the magnetic field is not applied to the magnetic particles in the heat exchanger vessel 10, and the magnetic particles are placed in a heat-absorbing state. In this state a temperature of the magnetic particles drops. At the time, the refrigerant is caused to flow in the direction from the high-temperature-end side pipe 70b to the low temperature side pipe 70a by the refrigerant flow device as shown by white arrows and transports cold heat. The refrigerant flowing time in the magnetic field removed state corresponds to $Tc_{flow}$ of FIG. 3.

Next, the magnetic circuit 20 is rotated by the driving unit 30. In the case of FIG. 2B, i.e., when the rotation angle is 180°, the magnetic flux from the permanent magnet 22 to the magnetic yoke 24 traverses the center of the cross section of the heat exchanger vessel 10 as shown in the figure. Accordingly, the magnetic field is applied to the magnetic particles in the heat exchanger vessel 10, and the magnetic particles are placed in a heat-generating state. In this state, heat is generated by the magnetocaloric effect and a temperature of the magnetic particles rises. At the time, the refrigerant is caused to flow in the direction from the low-temperature-end side pipe 70a to the high temperature side pipe 70b by the refrigerant flow device as shown by white arrows and transports hot heat. The refrigerant flowing time in the magnetic field applied state corresponds to $Th_{flow}$ of FIG. 3.

Thereafter, the magnetic circuit 20 is further rotated by the driving unit 30 and returned to the magnetic field removed state of FIG. 2A again. Note that, in FIG. 3, the time from the magnetic field removed state to the magnetic field applied state is shown by $T_{on}$, and the time from the magnetic field applied state to the magnetic field removed state is shown by $T_{off}$. Here, $T_{on}$ to $Tc_{flow}$ through $Th_{flow}$ and $T_{off}$ shows one AMR cycle, and $T_{on}+Th_{flow}+T_{off}+Tc_{flow}$ shows an AMR cycle time. A temperature gradient (temperature difference) is generated between the high temperature end and the low temperature end of the heat exchanger vessel by repeating the AMR cycle so that an object (portion to be cooled), which is thermally connected to the low temperature side heat exchanging unit 40 of FIG. 1, can be cooled by the flow of heat caused by the refrigerant.

According to the magnetic refrigeration device of the first embodiment, a magnetic refrigeration device, which can be reduced in size as well as improve a magnetic refrigeration efficiency, can be realized. More specifically, since the heat exchanger vessel is arranged as the helical structure, the length between the high temperature end and the low temperature end in which the temperature gradient is generated, can be easily reduced. As a result, the magnetic refrigeration device can be reduced in size, and further a magnetic refrigeration device having a flat structure can be also realized. When the magnetic refrigeration device is mounted on, for example, a home refrigerator/freezer and the like, although a restriction arises in space saving and a mounting space, it can be easily coped with because the magnetic refrigeration device is provided with an excellent degree of freedom of an outside shape by the helical structure.

Further, since the magnetic refrigeration device of the first embodiment is of a rotary type, it can improve energy efficiency as compared with a reciprocating type because it does not convert a rotating motion to a linear motion. Accordingly, COP (Coefficient of Performance: COP=refrigeration output/input energy) can be improved. Further, since the rotary type can increase the cycle frequency of the AMR cycle as compared with the reciprocating type, a refrigeration output can be increased.

Note that the magnetic circuit is preferably rotated in one direction at all times from a point of view of increasing the energy efficiency of the driving unit and improving COP. However, the removal and the application of the magnetic field may be realized by an arrangement for rotating the magnetic circuit in an opposite direction.

Further, the example, in which the magnetic circuit is rotated, is explained here. However, the heat exchanger vessel may be rotated in place of the magnetic circuit which is composed of a relatively heavy material such as the permanent magnet, the electromagnetic soft iron, and the like. In this case, the energy consumed by the driving unit can be reduced and high COP can be realized.

Figure 4:
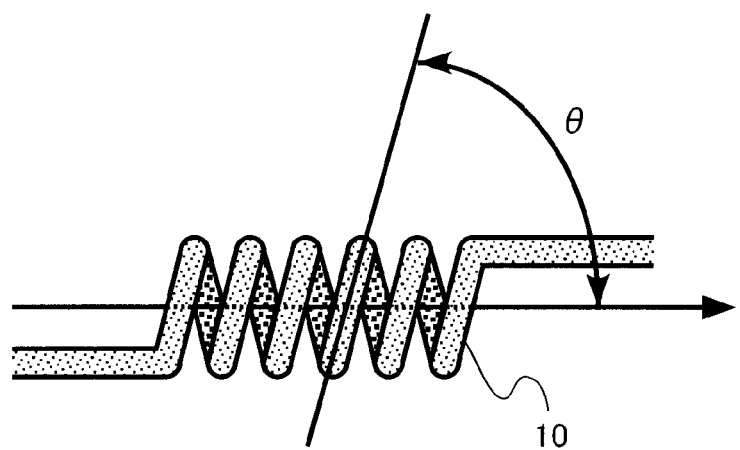
FIG. 4 is a view showing a definition of a helical angle.

FIG. 4 is a view showing the definition of a helical angle. In this specification, in a helical structure in which a curve is obliquely drawn with respect to the center axis of a helix (arrow in the figure), the helical angle ($\theta$) means the angle between the tangential direction (line segment in the figure) of the oblique curve and the direction of a center axis. In the first embodiment, the helical angle ($\theta$) of the helical structure is preferably 10° or more to 80° or less. This is because when the helical angle is less than 10°, since the length of the heat exchanger vessel must be increased in an axial direction to fill the magnetic particles in a predetermined amount which is necessary to secure a refrigeration capability, the effect of reducing a size by arranging the heat exchanger vessel as the helical structure cannot be sufficiently obtained. Further, this is because when the helical angle is more than 80°, since a leakage magnetic field is increased because the helical pitch is narrowed as well as the interval at which the magnetic field is applied to and removed from the magnetic circuit is reduced, the change of a magnetic flux to the magnetic particles is reduced and thus the refrigeration capability is lowered.

Further, it is preferable that the heat exchanger vessel be filled with at least two types of magnetic particles which have a different magnetic transition temperature and layered (or "stacked") in a refrigerant flowing direction. More specifically, it is preferable that the heat exchanger vessel be filled with magnetic particles having a temperature higher than a magnetic transition temperature on the high temperature end side thereof and with magnetic particles having a temperature lower than the magnetic transition temperature on the low temperature end side thereof. As described above, the operating temperature range of the magnetic refrigeration device can be increased by laminating the magnetic particles having the different magnetic transition temperatures.

Further, in the magnetic refrigeration device of the first embodiment, since the heat generated and absorbed by the magnetic material is thermally transported by the refrigerant, a design for increasing heat exchange efficiency and reducing a pressure loss while securing a space used as a flow path is necessary. When heat is exchanged between the magnetic particles and the refrigerant at the time the magnetic particles are filled at a low filling ratio, the magnetic particles are vibrated and collided with each other by the flow of the refrigerant. The magnetic particles are cracked and further broken by the collision. Since fine powder generated by the broken magnetic particles increases the pressure loss of the refrigerant, the refrigeration capability is lowered.

To avoid the above circumstances, it is preferable to fill the magnetic particles at a volume filling ratio of 40% or more to 70% or less. When the volume filling ratio is less than 40%, the filling amount of the magnetic particles is reduced, further fine powder is outstandingly generated, and the heat exchange efficiency itself is greatly lowered, whereas when the volume filling ratio is more than 70%, the pressure loss is outstandingly increased when the refrigerant circulates. Further, it is more preferable to fill the magnetic particles at the volume filling ratio of 50% or more to 65% or less.

The particle diameter (major axis) of the magnetic particles is preferably 0.1 mm or more to 2 mm or less. To realize a high refrigeration capability, it is important that heat is sufficiently exchanged between the magnetic particles and the refrigerant. To exchange heat sufficiently, it is necessary to increase the specific surface area of the magnetic particles. In the magnetic particles of the present invention, to increase the specific surface area, it is effective to make the particle diameter of the magnetic particles small. However, when the particle diameter is too small, since the pressure loss of the refrigerant increases, it is necessary to select an optimum particle diameter taking it into consideration. The particle diameter of the magnetic particles for executing the magnetic refrigeration is preferably 0.1 mm or more to 2 mm or less and more preferably 0.3 mm or more to 1.0 mm or less.

Further, the magnetic particles preferably have a smooth particle shape without projections on a surface, and, the shape is preferably, for example, a spherical shape or an ellipsoid-of-revolution shape. With this shape, generation of fine powder due to breakage of the particles can be prevented as well as an increase of the pressure loss of the refrigerant can be suppressed.

Further, 80 wt % or more of the filled magnetic particles preferably have an aspect ratio of 2 or less. This is a result of the following experiment executed using approximately spherical particles mixed with deformed particles having the aspect ratio of 2 or more. In the experiment, it is found that when the amount of the deformed particles mixed was 20% or more, since the particles were exposed to the flow of the refrigerant for a long period of time, fine powder was generated and thus the pressure loss of a fluid was increased. The pressure loss can be reduced and the heat exchange efficiency can be improved at the same time by setting the particle diameter of the spherical magnetic particles to 0.1 mm or more to 2 mm or less and composing 80 wt % or more of the magnetic particles of particles having an aspect ratio of 2 or less.

Note that the magnetic particles are not limited to Gd described above, and any magnetic particles, for example, Gd compounds formed by mixing various elements with Gd (gadolinium), intermetallic compounds composed of various rare earth elements and transition metal elements, $Ni_2MnGa$ alloys, GdGeSi compounds, $LaFe_{13}$ compound, $LaFe_{13}H$, and the like can be used as long as they exhibit the magnetocaloric effect.

Note that water is most suitable as the refrigerant because it has a highest specific heat and is less expensive. However, oil refrigerants such as mineral oil, silicon, and the like, solvent refrigerants such as alcohols including ethylene glycol and the like can be also used in a temperature region of 0° or less. The oil refrigerants, the solvent refrigerants, water, and mixed liquids of them can be selected according to the operating temperature region of a refrigeration cycle. It is preferable to select an optimum particle diameter as the particle diameter of the magnetic particles according to the viscosity (surface tension) of the refrigerant to be used and the size of the heat exchanger vessel. Further, a gas may be used as the refrigerant. In this case, it is preferable to reduce the particle diameter of the magnetic particles. This is because the pressure loss is reduced by using the gas, and when the particle diameter is reduced, since the filling amount of the magnetic particles and the surface area of all the particles are increased, the refrigeration capability is also increased.

Figure 5:
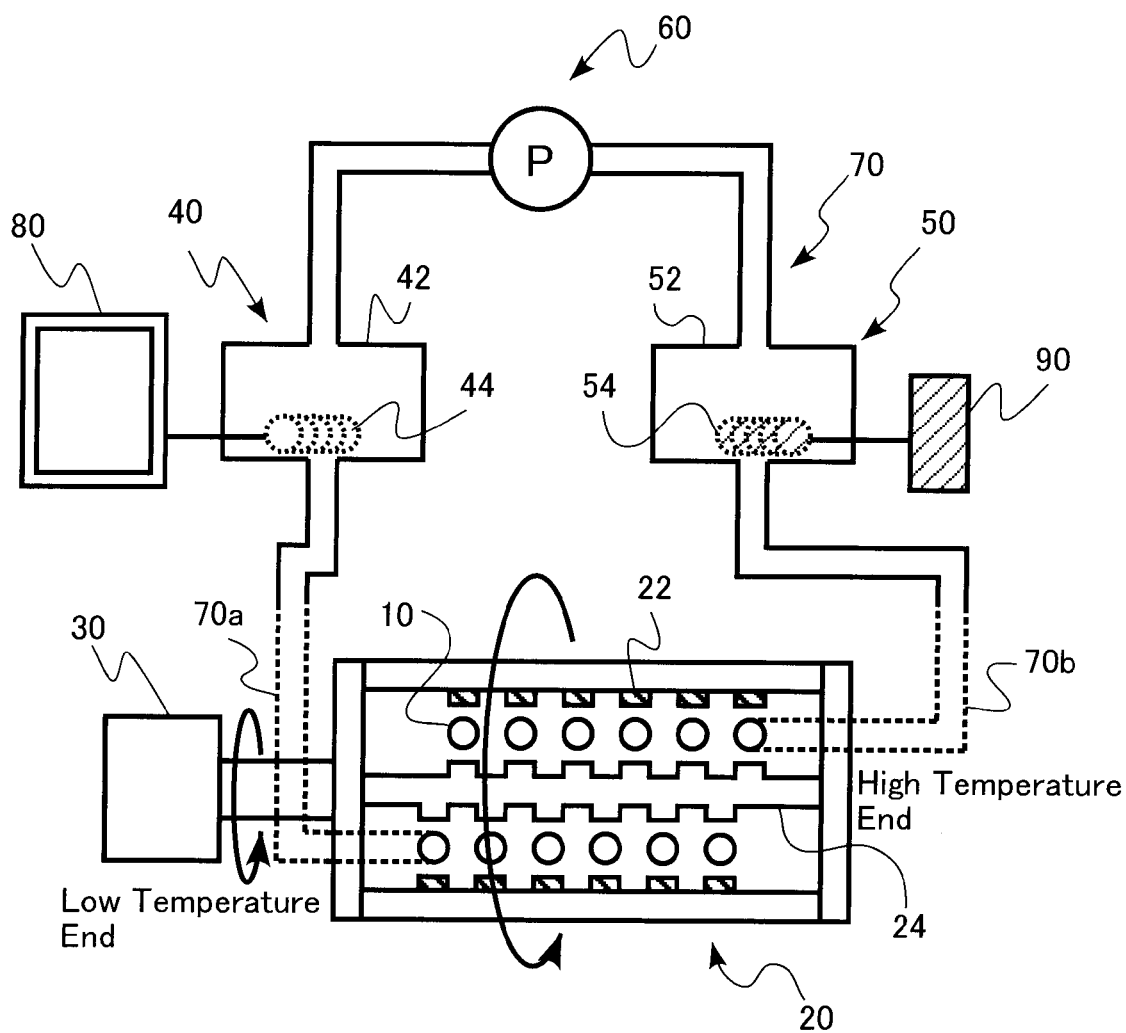
FIG. 5 is a structure sectional view of a magnetic refrigeration system using the magnetic refrigeration device of the first embodiment.

FIG. 5 is a structure sectional view of a magnetic refrigeration system using the magnetic refrigeration device described above. The magnetic refrigeration system has a cooling unit thermally connected to the low temperature side heat exchanging unit and a radiation unit thermally connected to the high temperature side heat exchanging unit in addition to the magnetic refrigeration device described above.

The low temperature side heat exchanging unit 40 is composed of a low temperature side reservoir 42 for reserving a low temperature refrigerant and a low temperature side heat exchanger device 44 disposed therein in contact with the refrigerant. Likewise, the high temperature side heat exchanging unit 50 is composed of a high temperature side reservoir 52 for reserving a high temperature refrigerant and a high temperature side heat exchanger device 54 disposed therein in contact with the refrigerant. Then, the cooling unit 80 is thermally connected to the low temperature side heat exchanger device 44 and the radiation unit 90 is thermally connected to the high temperature side heat exchanger device 54.

The magnetic refrigeration system can be applied to, for example, a home refrigerator. In this case, the cooling unit 80 is a freezing/refrigerating chamber as an object to be cooled, and the radiation unit 90 is, for example, a radiation plate.

The magnetic refrigeration system is not particularly limited to the home refrigerator. That is, the refrigeration system can be also applied to, for example, a home freezer/refrigerator, a home air conditioner, an industrial freezer/refrigerator, a large frozen/refrigerated warehouse, a frozen chamber for reserving and transporting a liquefied gas, and the like in addition to the home refrigerator described above. A necessary freezing capability and a necessary control temperature region are different depending on a location where the above equipment is applied. However, the refrigeration capability can be changed depending on how the magnetic particles are used. Further, since the magnetic transition temperature can be changed by controlling the material of the magnetic particles, the control temperature region can be matched to a particular temperature region. Further, the refrigeration system can be also applied to an air conditioning system such as a home air conditioner, an industrial air conditioner, and the like making use of the heat radiated from the magnetic refrigerator device for heating air. The refrigeration system may be applied to a plant making use of both a cooling operation and a heating operation.

A magnetic refrigeration system, which can be reduced in size and improve the magnetic refrigeration efficiency, can be realized by the magnetic refrigeration system of the first embodiment.

Second Embodiment

A magnetic refrigeration device and a magnetic refrigeration system of a second embodiment are the same as those of the first embodiment except that they are of a so-called reciprocating type in which a driving unit has a linear reciprocating motion mechanism for causing a magnetic circuit to make a linear reciprocating motion with respect to a heat exchanger vessel. Accordingly, the description of overlapping contents is omitted.

Figure 6:
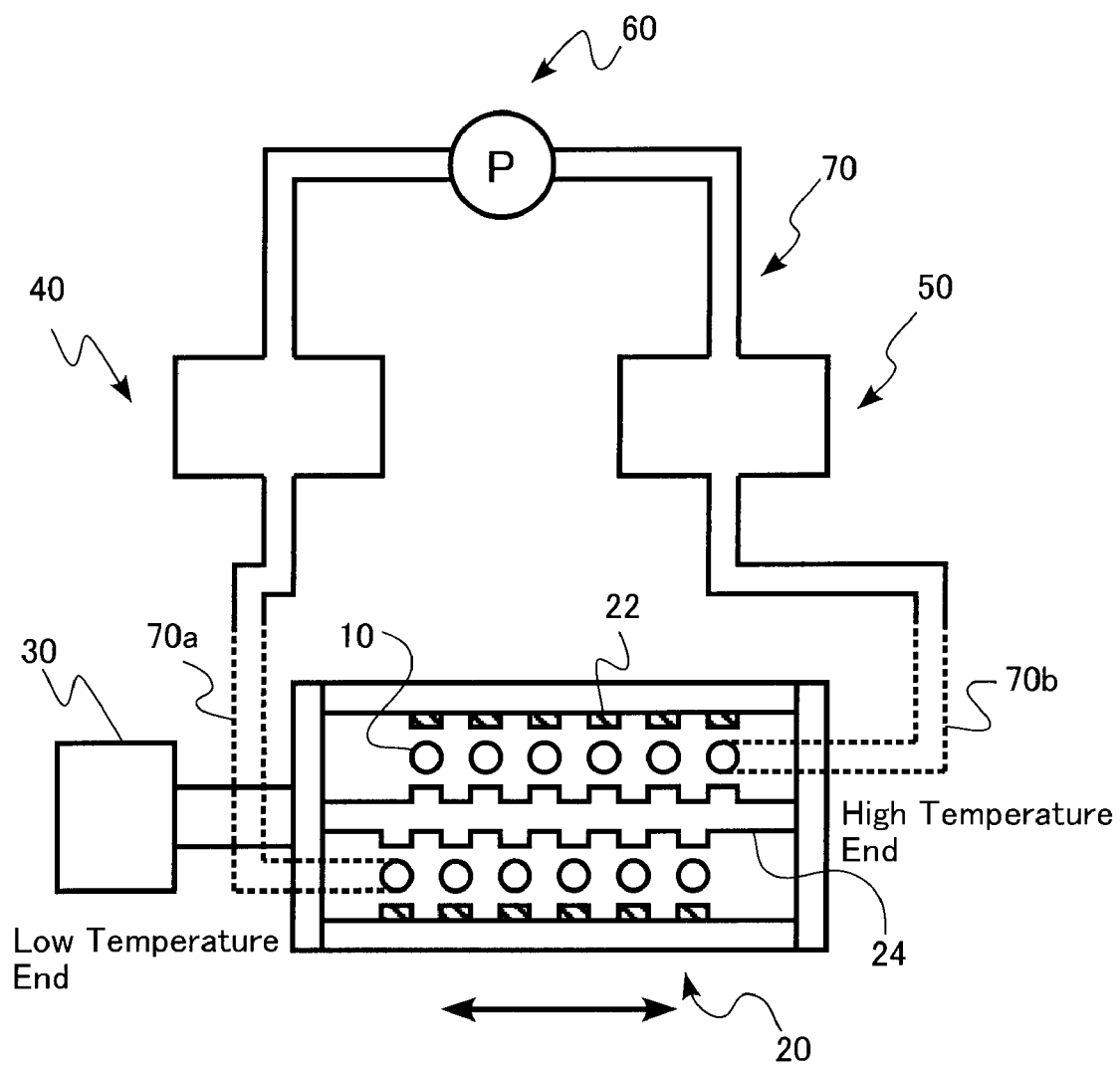
FIG. 6 is a structure sectional view of a magnetic refrigeration device of a second embodiment.

FIG. 6 is a structure sectional view of the magnetic refrigeration device of the second embodiment. As shown in FIG. 6, the driving unit 30 has the linear reciprocating motion mechanism for causing the magnetic circuit 20 to make the linear reciprocating motion in the direction of an arrow in the figure. A crank mechanism, which converts the rotating motion generated by, for example, a motor and the like to a linear reciprocating motion, can be applied as the linear motion mechanism.

Figure 7A:
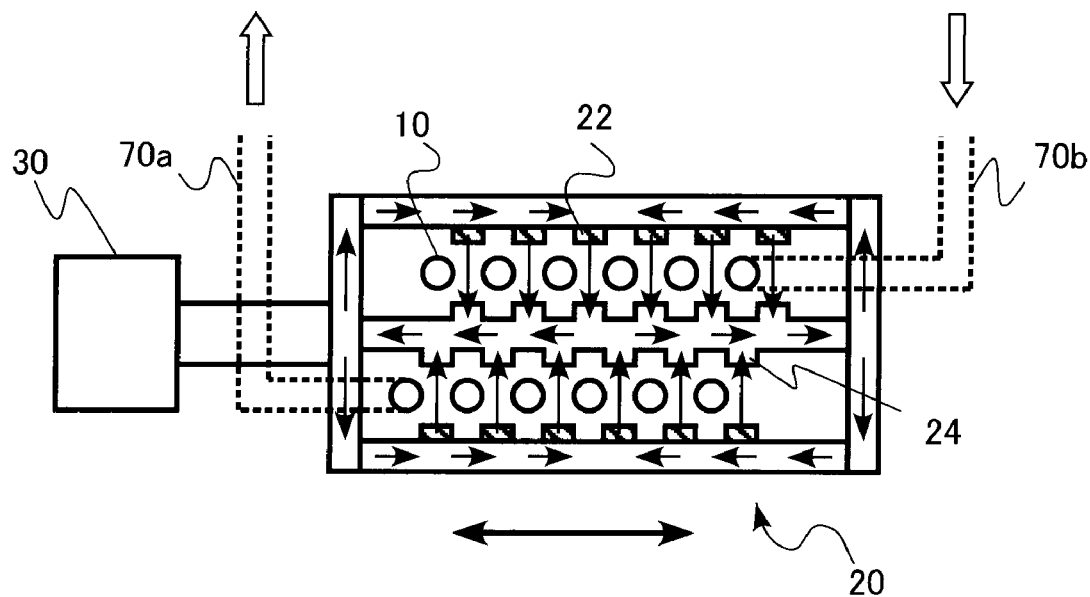
FIGS. 7A and 7B are sectional views of a main portion of the magnetic refrigeration device of the second embodiment.
Figure 7B:
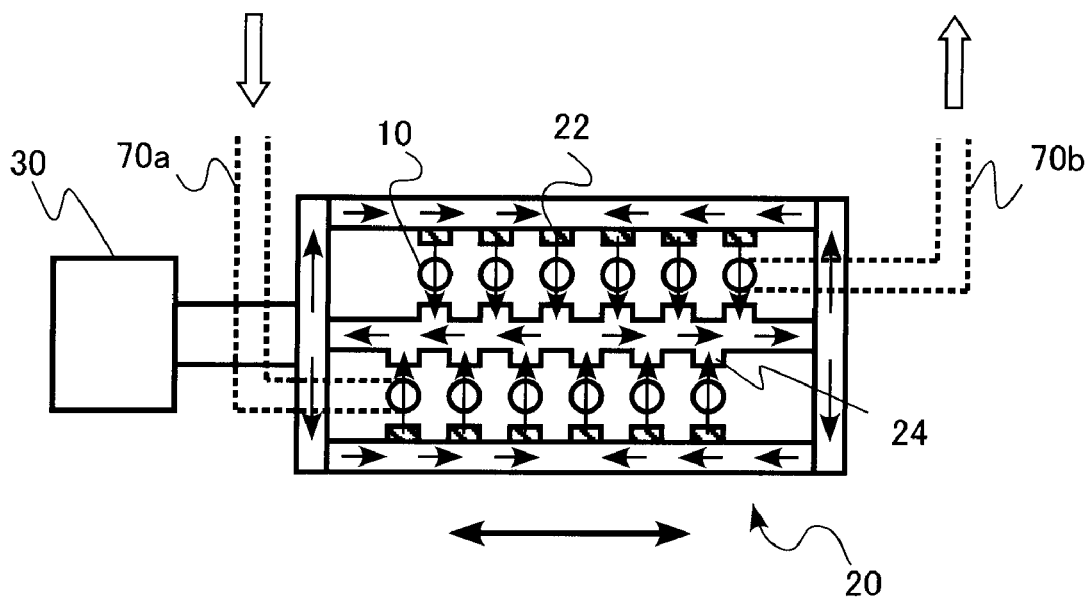

Next, an operating principle of the magnetic refrigeration device will be explained referring to FIGS. 6 and 7A and 7B. FIGS. 7A and 7B are sectional views of a main portion of the magnetic refrigeration device. FIG. 7A is the sectional view of the main portion of the magnetic refrigeration device when a magnetic field is applied, and FIG. 7B is the sectional view of the main portion of the magnetic refrigeration device when the magnetic field is removed.

First, in the case of FIG. 7A, a magnetic flux from a permanent magnet 22 to a magnetic yoke 24 does not traverse a heat exchanger vessel 10 as shown in the figure. Accordingly, a magnetic field is not applied to the magnetic particles in the heat exchanger vessel 10, and the magnetic particles are placed in a heat-absorbing state. At the time, a refrigerant is caused to flow in the direction from a high-temperature-end side pipe 70b to a low temperature side pipe 70a by a refrigerant flow device as shown by white arrows and transports cold heat.

Next, the magnetic circuit 20 is caused to be linearly moved in the direction of the driving unit 30 (left direction) by the driving unit 30. Then, in the case of FIG. 7B, the magnetic flux from the permanent magnet 22 to the magnetic yoke 24 traverses the center of the cross section of the heat exchanger vessel 10 as shown in the figure. Accordingly, the magnetic field is applied to the magnetic particles in the heat exchanger vessel 10, and the magnetic particles generate heat by a magnetocaloric effect. At the time, the refrigerant is caused to flow in the direction from the low-temperature-end side pipe 70a to the high temperature side pipe 70b by the refrigerant flow device as shown by white arrows and transports hot heat.

Thereafter, the magnetic circuit 20 is moved by the driving unit 30 in a direction in which it is made far from the driving unit 30 and returned to a magnetic field removed state of FIG. 7A again. A temperature gradient (temperature difference) is generated between the high temperature end and the low temperature end of the heat exchanger vessel by repeating the AMR cycle described above so that an object (cooling unit), which is thermally connected to the low temperature side heat exchanging unit 40 of FIG. 6, can be cooled by the flow of heat caused by the refrigerant.

Third Embodiment

A magnetic refrigeration device and a magnetic refrigeration system of a third embodiment are the same as those of the first embodiment except that a heat exchanger vessel has a double helical structure, in which two helical portions are combined, and that the two helical portions are connected in series in a refrigerant flowing direction. Accordingly, the description of overlapping contents is omitted.

Figure 8A:
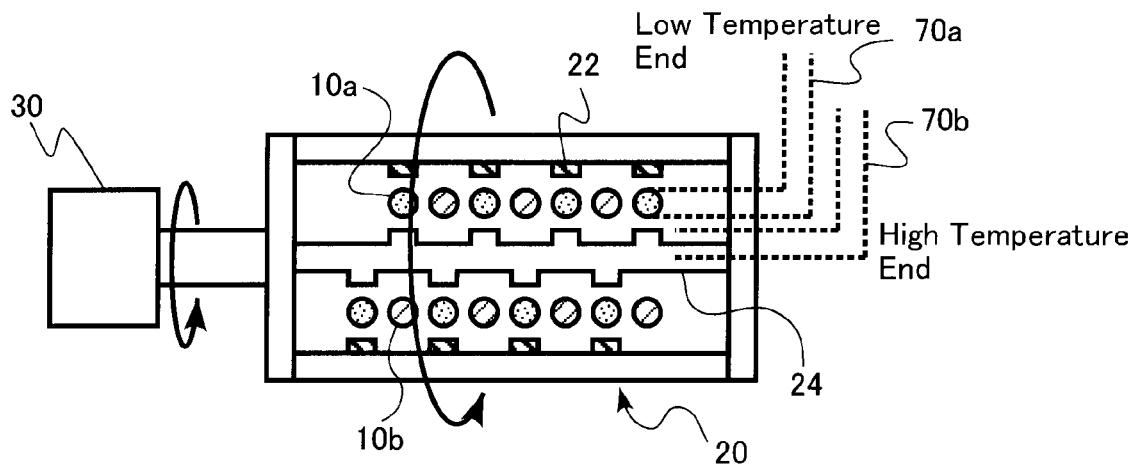
FIG. 8A is a structure sectional view of a main portion of a magnetic refrigeration device of a third embodiment.
Figure 8B:
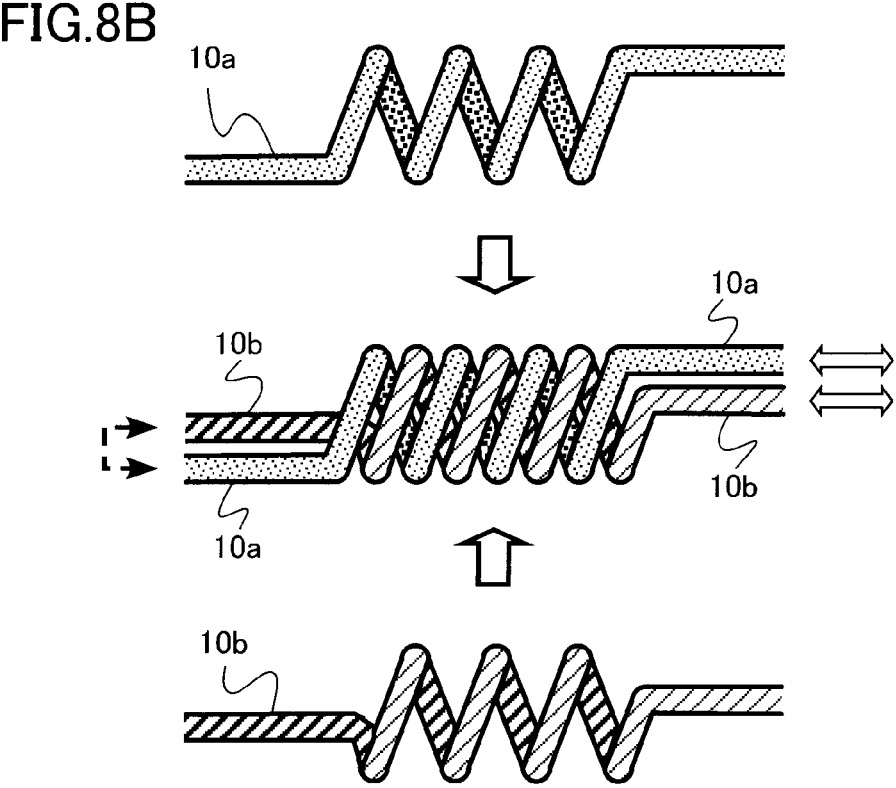
FIG. 8B is an outside appearance view of a heat exchanger vessel.
Figure 8C:
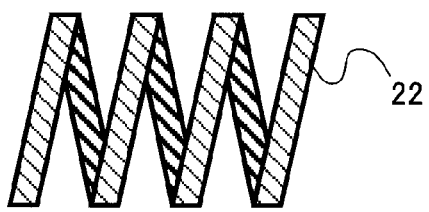
FIG. 8C is an outside appearance view of a permanent magnet which is a component of a magnetic circuit.

FIG. 8A is a structure sectional view of a main portion of the magnetic refrigeration device of the third embodiment, FIG. 8B is an outside appearance view of the heat exchanger vessel, and FIG. 8C is an outside appearance view of a permanent magnet as a component of a magnetic circuit. As shown in FIG. 8B, the heat exchanger vessel has a multiple helical structure in which the two helical portions 10a, 10b are combined. As shown by a broken arrow, the helical portions 10a and 10b are connected in series through the ends thereof connected by a not shown pipe. The helical portion 10a is connected to the low-temperature-end side pipe 70a and the helical portion 10b is connected to the high-temperature-end side pipe 70b through the ends thereof which are not connected to each other. As shown in FIG. 8C, the permanent magnet 22 is formed at the same pitch as that of the helical portions 10a, 10b.

Figure 9A:
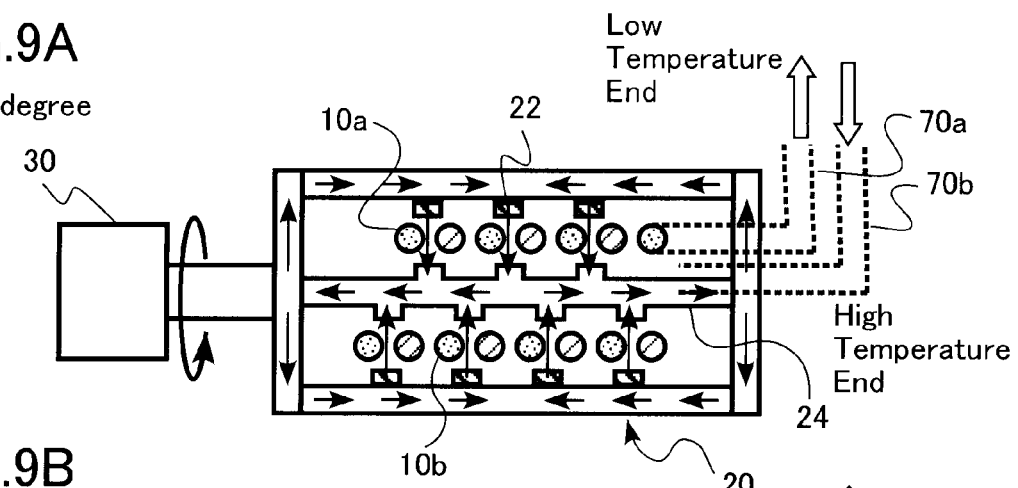
FIGS. 9A to 9D are sectional views of a main portion of a magnetic refrigeration device of the third embodiment.
Figure 9B:
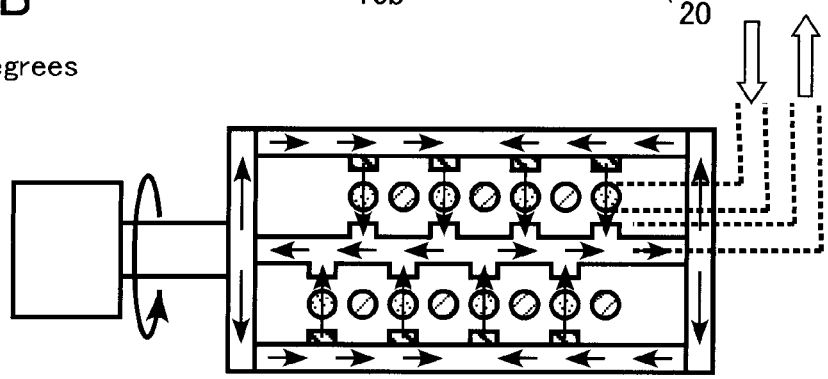
Figure 9C:
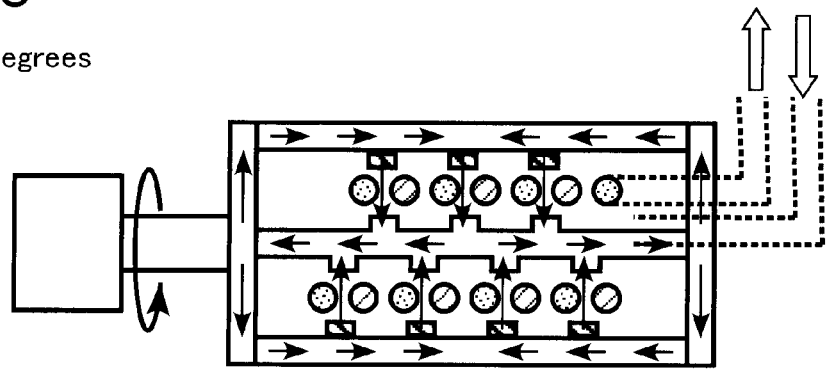
Figure 9D:
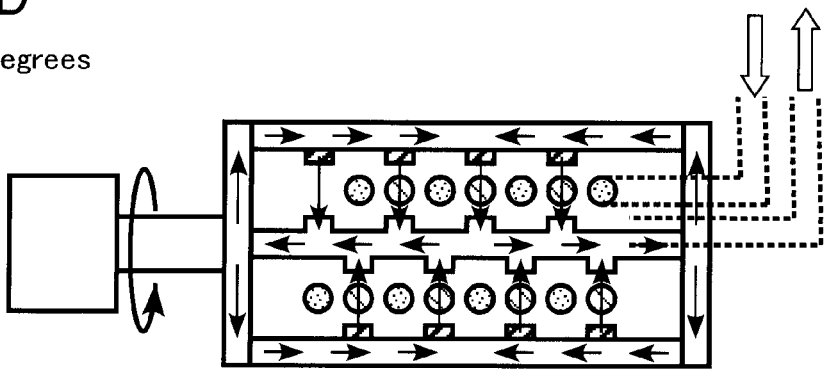

Next, an operating principle of the magnetic refrigeration device will be explained referring to FIGS. 9A to 9D. FIGS. 9A to 9D are sectional views of a main portion of the magnetic refrigeration device. FIG. 9A is a sectional view when a magnetic field is removed (rotation angle 0°), FIG. 9B is a sectional view when the magnetic field is applied (rotation angle 90°), FIG. 9C is a sectional view when the magnetic field is removed (rotation angle 180°), and FIG. 9D is a sectional view when the magnetic field is applied (rotation angle 270°). Further, in FIGS. 9A to 9D, the direction of a magnetic flux is shown by black arrows.

First, in the case of FIG. 9A, i.e., when the rotation angle is 0°, the magnetic flux from the permanent magnet 22 to a magnetic yoke 24 does not traverse the heat exchanger vessel 10 as shown in the figure. Accordingly, a magnetic field is not applied to the magnetic particles in the heat exchanger vessel 10, and the magnetic particles are placed in a heat-absorbing state. At the time, a refrigerant is caused to flow in the direction from the high-temperature-end side pipe 70b to the low temperature side pipe 70a by a refrigerant flow device as shown by white arrows and transports cold heat.

Next, the magnetic circuit 20 is rotated by the driving unit 30. In the case of FIG. 9B, i.e., when the rotation angle is 90°, the magnetic flux from the permanent magnet 22 to the magnetic yoke 24 traverses the center of the cross section of the helical portion 10a of the heat exchanger vessel as shown in the figure. Accordingly, the magnetic field is applied to the magnetic particles in the helical portion 10a of the heat exchanger vessel 10, and the magnetic particles generate heat by a magnetocaloric effect. At the time, the refrigerant is caused to flow in the direction from the low-temperature-end side pipe 70a to the high temperature side pipe 70b by the refrigerant flow device as shown by white arrows and transports hot heat.

Thereafter, the magnetic circuit 20 is further rotated by the driving unit 30. As a result, in the case of FIG. 9C, i.e., when the rotation angle is 180°, the magnetic flux from the permanent magnet 22 to the magnetic yoke 24 does not traverse the heat exchanger vessel 10 as shown in the figure. Accordingly, the magnetic field is not applied to the magnetic particles in the heat exchanger vessel 10 and the magnetic particles are placed in the heat-absorbing state likewise FIG. 9A. Accordingly, the refrigerant is caused to flow in the direction from the high-temperature-end side pipe 70b to the low temperature side pipe 70a by the refrigerant flow device as shown by white arrows and transports cold heat.

Next, the magnetic circuit 20 is rotated by the driving unit 30. In the case of FIG. 9D, i.e., when the rotation angle 270°, the magnetic flux from the permanent magnet 22 to the magnetic yoke 24 traverses the center of the cross section of the helical portion 10a of the heat exchanger vessel 10 as shown in the figure. Accordingly, the magnetic field is applied to the magnetic particles in the helical portion 10b of the heat exchanger vessel, and the magnetic particles generate heat by the magnetocaloric effect. At the time, the refrigerant is caused to flow in the direction from the low-temperature-end side pipe 70a to the high temperature side pipe 70b by the refrigerant flow device as shown by white arrows and transports hot heat. A temperature gradient (temperature difference) is generated between the high temperature end and the low temperature end of the heat exchanger vessel by repeating the above AMR cycle.

According to the third embodiment, a heat absorbing/generating reaction is repeated twice while the magnetic circuit rotates once. Accordingly, magnetic refrigeration efficiency can be improved. When the helical portion 10b on the high temperature end side is filled with magnetic particles having a higher magnetic transition temperature and the helical portion 10b on the low temperature end side is filled with magnetic particles having a lower magnetic transition temperature, a magnetic refrigeration device and a magnetic refrigeration system which can be used in a wider temperature region can be provided. Further, when the helical portion 10a and the helical portion 10b are filled with magnetic particles having the same magnetic transition temperature, since a refrigeration output becomes twice as large as that of a single helical structure, a magnetic refrigeration device and a magnetic refrigeration system having a large output can be realized.

Fourth Embodiment

A magnetic refrigeration device and a magnetic refrigeration system of a fourth embodiment are the same as those of the third embodiment except that a heat exchanger vessel has a triple helical structure having three helical portions and that the three helical portions are connected in series in a refrigerant flowing direction. Accordingly, the description of overlapping contents is omitted.

Figure 10:
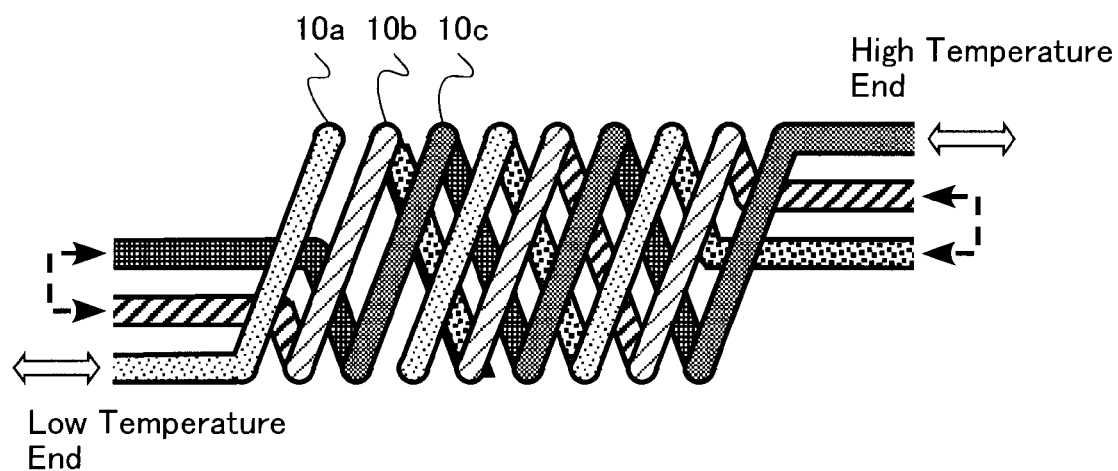
FIG. 10 is an outside appearance view of a heat exchanger vessel of a fourth embodiment.

FIG. 10 is an outside appearance view of the heat exchanger vessel of the fourth embodiment. As shown in FIG. 10, the heat exchanger vessel has a multiple helical structure in which the three helical portions 10a, 10b, and 10c are combined. The helical portions 10a, 10b, and 10c are connected in series by that the ends thereof, which are shown by broken arrows, are connected by a not shown pipe. Then, the helical portion 10a is connected to a low-temperature-end side pipe and the helical portion 10c is connected to a high-temperature-end side pipe through the ends thereof which are not connected to each other.

According to the fourth embodiment, a heat absorbing/generating reaction is repeated three times while a magnetic circuit rotates once. Therefore, magnetic refrigeration efficiency can be more improved. When the helical portion 10c on a high temperature end side is filled with magnetic particles having a higher magnetic transition temperature, the helical portion 10b is filled with magnetic particles having a lower magnetic transition temperature, and the helical portion 10a on a low temperature end side is filled with magnetic particles having a much lower magnetic transition temperature, a magnetic refrigeration device and a magnetic refrigeration system which can be used in a wider temperature region can be provided. In contrast, when the helical portions 10a, 10b and 10c are filled with magnetic particles having the same magnetic transition temperature, since a refrigeration output becomes thrice as large as that of a single helical structure, a magnetic refrigeration device and a magnetic refrigeration system having a larger output can be realized.

Fifth Embodiment

A magnetic refrigeration device and a magnetic refrigeration system of a fifth embodiment are the same as those of the second embodiment except that a magnetic circuit is a cylindrical confronting type magnetic circuit and that a linear reciprocating motion has a long stroke. Accordingly, the description of overlapping contents is omitted.

Figure 11A:
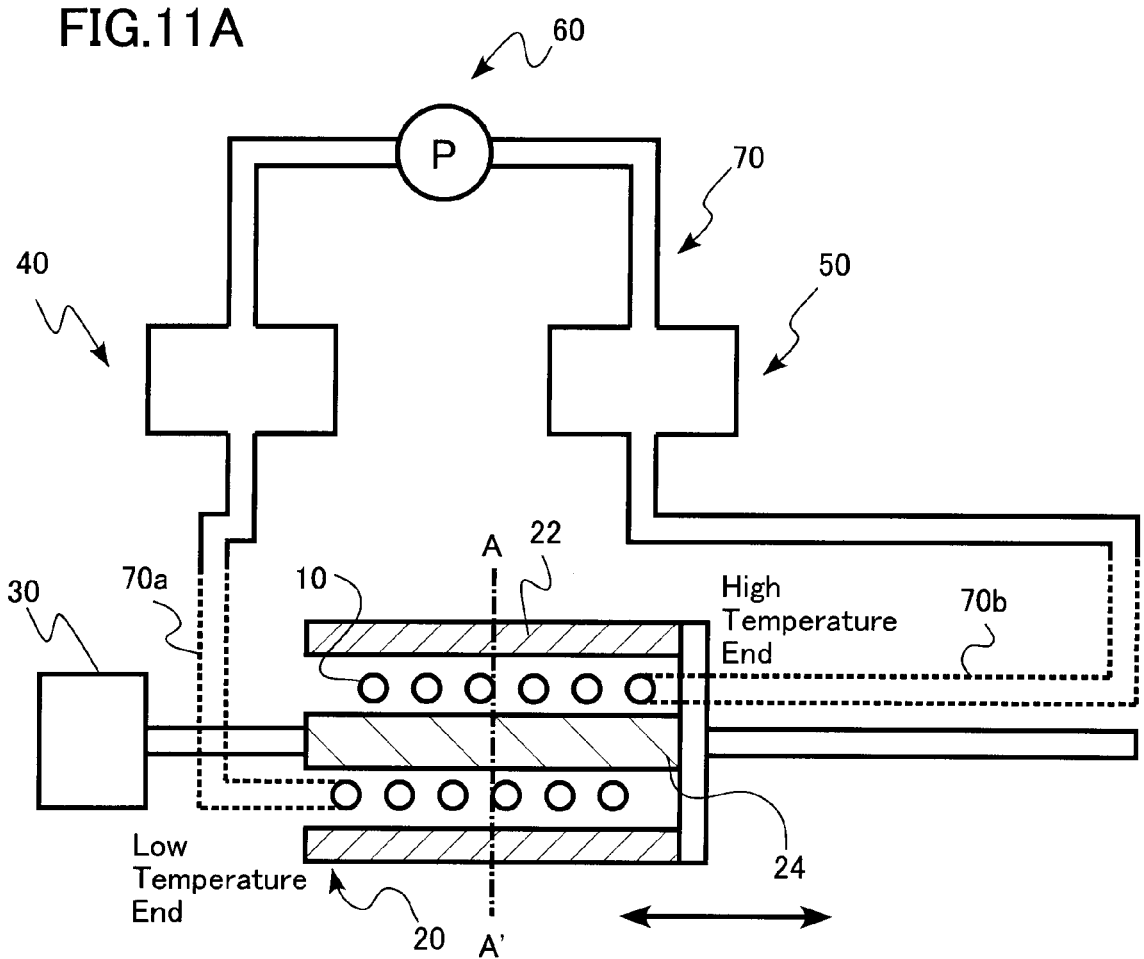
FIG. 11A is a structure sectional view of a magnetic refrigeration device of a fifth embodiment.
Figure 11B:
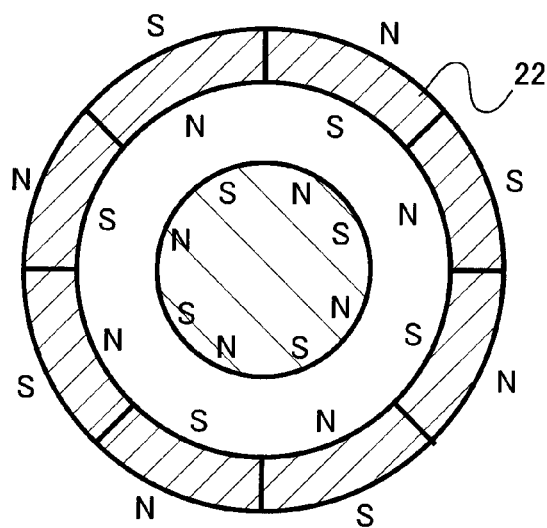
FIG. 11B is an enlarged view of an A-A' cross section of FIG. 11A.

FIG. 11A is a structure sectional view of the magnetic refrigeration device of the fifth embodiment. FIG. 11B is an enlarged view of an A-A' cross section of FIG. 11A. As shown in FIG. 11A, a driving unit 30 has a linear reciprocating motion mechanism for causing the magnetic circuit 20 to make a linear reciprocating motion in the direction of an arrow in the figure. Further, as shown in FIGS. 11A and 11B, the magnetic circuit 20 of the fifth embodiment is composed of the cylindrical confronting type magnetic circuit.

Figure 12A:
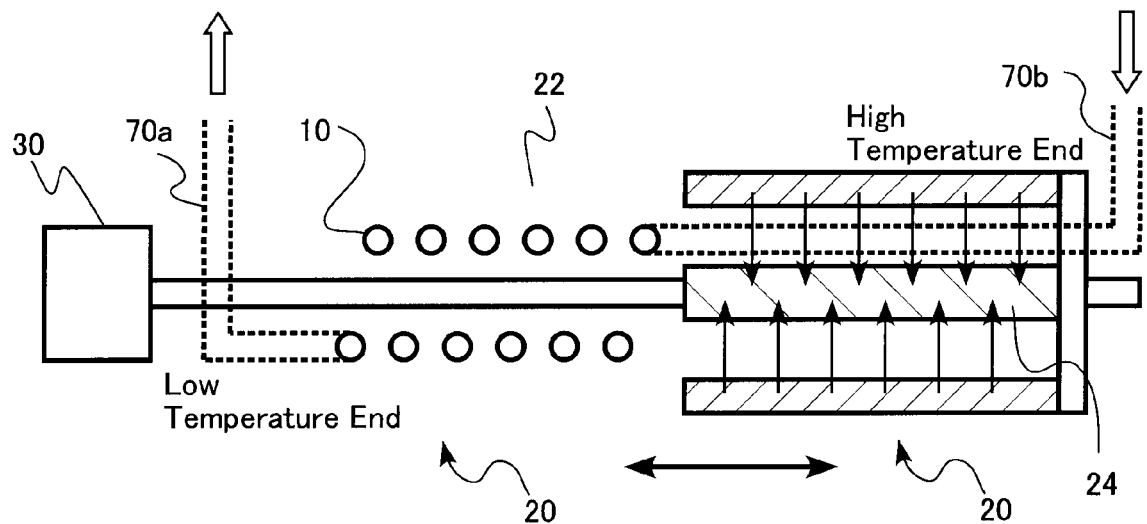
FIGS. 12A and 12B are sectional views of a main portion of the magnetic refrigeration device of the fifth embodiment.
Figure 12B:
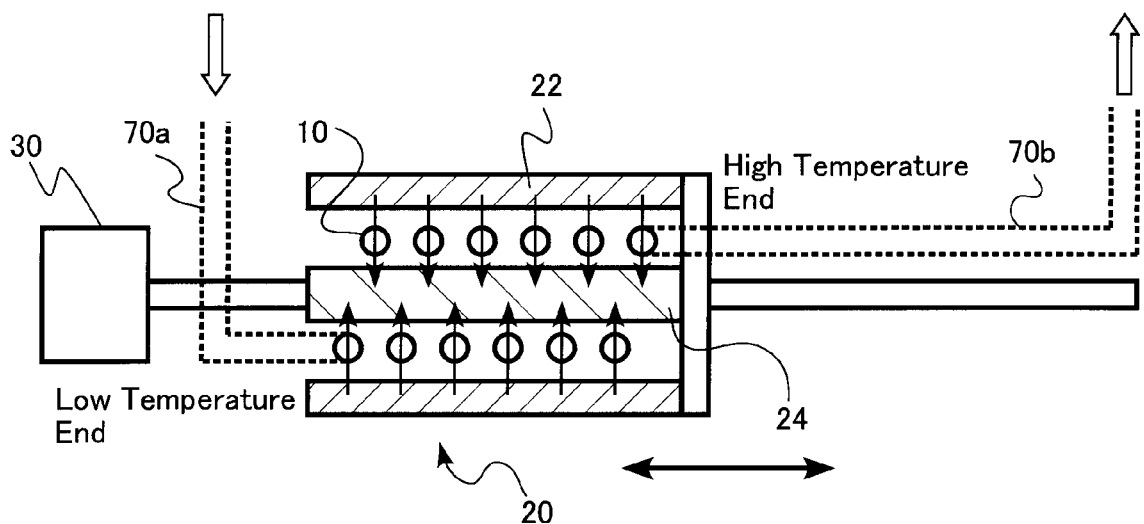

Next, an operating principle of the magnetic refrigeration device will be explained referring to FIGS. 12A and 12B. FIGS. 12A and 12B are sectional views of a main portion of the magnetic refrigeration device of the fifth embodiment. FIG. 12A is a sectional view when a magnetic field is removed, and FIG. 12B is a sectional view when the magnetic field is applied.

First, in the case of FIG. 12A, a magnetic flux from a permanent magnet 22 to a magnetic yoke 24 does not traverse a heat exchanger vessel 10 as shown in the figure. Accordingly, the magnetic field is not applied to the magnetic particles in the heat exchanger vessel 10, and the magnetic particles are placed in a heat-absorbing state. At the time, the refrigerant is caused to flow in the direction from a high-temperature-end side pipe 70*b* to a low temperature side pipe 70*a* by a refrigerant flow device as shown by white arrows and transports cold heat.

Next, the magnetic circuit 20 is linearly moved by the driving unit 30 in the direction of the driving unit 30 (left direction). In the case of FIG. 11B, the magnetic flux from the permanent magnet 22 to the magnetic yoke 24 traverses the center of the cross section of the heat exchanger vessel 10 as shown in the figure. Accordingly, the magnetic field is applied to the magnetic particles in the heat exchanger vessel 10, and the magnetic particles generate heat by a magneto caloric effect. At the time, the refrigerant is caused to flow in the direction from the low-temperature-end side pipe 70*a* to the high-temperature-end side pipe 70*b* by the refrigerant flow device as shown by white arrows and transports hot heat.

Thereafter, the magnetic circuit 20 is moved by the driving unit 30 in a direction in which it is made far from the driving unit 30 and returned to a magnetic field removed state of FIG. 11A again. A temperature gradient (temperature difference) is generated between the high temperature end and the low temperature end of the heat exchanger vessel by repeating the AMR cycle so that an object (cooling unit), which is thermally connected to a low temperature side heat exchanging unit, can be cooled by the flow of heat caused by the refrigerant.

According to the fifth embodiment, since the heat exchanger vessel is arranged as a helical structure, the stroke of the linear reciprocating motion can be reduced as compared with the case in which a heat exchanger vessel of a linear structure is used. Therefore, the fifth embodiment is advantageous in reduction of a size as well as in realization of improved COP. Further, when the cylindrical confronting type magnetic circuit is magnetized, since it can be magnetized by assembly magnetization, the fifth embodiment has an advantage in that it can be manufactured at a less expensive cost. Note that the assembly magnetization is a technology for executing pulse magnetization to a confronting structure using a magnet before it is magnetized after the confronting structure is assembled. Further, since the positional accuracy of confronting magnetic fields can be improved using the cylindrical confronting type magnetic circuit, a magnetic refrigerating operation can be stabilized.

The embodiments of the present invention have been explained above referring to the specific examples. However, the above embodiments are exemplified as only examples and do not restrict the present invention. Further, in the explanation of the embodiments, although the components of the magnetic refrigeration device, the magnetic refrigeration system, and the like, which are not directly necessary to the explanation of the present invention, are omitted, necessary components, which relate to the magnetic refrigeration device, the magnetic refrigeration system, and the like, can be appropriately selected and used.

In addition to the above-mentioned, all the magnetic refrigeration devices and the magnetic refrigeration systems, which have the components of the present invention and the design of which can be appropriately modified by persons skilled in the art, are included in the scope of the present invention. The scope of the present invention is defined by the scope of the appended claims and the scope of the equivalents thereof.

What is claimed is:

1. A magnetic refrigeration device comprising:
   a heat exchanger vessel of a hollow helical structure, an inside of the vessel being filled with magnetic particles having a magnetocaloric effect, the vessel having a curve oblique with respect to a center axis of a helix;
   a magnetic circuit configured to generate a magnetic field, the circuit including a permanent magnet having a helical structure and a magnet yoke;
   a driving unit configured to relatively move the heat exchanger vessel and the magnetic circuit so that the magnetic field can be applied to and removed from the magnetic particles;
   a low temperature side heat exchanging unit independent of the heat exchanger vessel;
   a high temperature side heat exchanging unit independent of the heat exchanger vessel;
   a refrigerant flow device; and
   a refrigerant circuit formed by connecting the heat exchanger vessel, the low temperature side heat exchanging unit, the high temperature side heat exchanging unit, and the refrigerant flow device by a pipe for circulating a refrigerant.

2. The device according to claim 1, wherein the driving unit comprises a rotational motion mechanism for causing the magnetic circuit to carry out a rotating motion with respect to the heat exchanger vessel.

3. The device according to claim 1, wherein the driving unit comprises a linear reciprocating motion mechanism for causing the magnetic circuit to carry out a linear reciprocating motion with respect to the heat exchanger vessel.

4. The device according to claim 1, wherein the inside of the heat exchanger vessel is filled with at least two kinds of magnetic particles having a different magnetic transition temperature and layered in a refrigerant flowing direction.

5. The device according to claim 1, wherein the heat exchanger vessel has a multiple helical structure in which a plurality of helical portions are combined, and the helical portions are connected in series in the refrigerant flowing direction.

6. The device according to claim 5, wherein each of the helical portions is filled with magnetic particles having a different magnetic transition temperature.

7. The device according to claim 1, wherein the helical structure has a helical angle of at least 10°.

8. The device according to claim 1, wherein the magnetic particles have a particle diameter of 0.1 mm or more to 2 mm or less and are formed in a substantially spherical shape, and the volume filling ratio of the magnetic particles in the heat exchanger vessel is 40% or more to 70% or less.

9. A magnetic refrigeration system comprising:
   a magnetic refrigeration device which comprises a heat exchanger vessel of a hollow helical structure, an inside of the vessel being filled with magnetic particles having a magnetocaloric effect, the vessel having a curve oblique with respect to a center axis of a helix, a magnetic circuit configured to generate a magnetic field, the circuit including a permanent magnet having a helical structure and a magnet yoke, a driving unit configured to relatively move the heat exchanger vessel and the magnetic circuit so that the magnetic field can be applied to and removed from the magnetic particles, a low temperature side heat exchanging unit independent of the heat exchanger vessel, a high temperature side heat exchanging unit independent of the heat exchanger vessel, a refrigerant flow device, and a refrigerant circuit formed by connecting the heat exchanger vessel, the low temperature side heat exchanging unit, the high temperature side heat exchanging unit, and the refrigerant flow device by a pipe for circulating a refrigerant;

a cooling unit thermally connected to the low temperature side heat exchanging unit; and a radiating unit thermally connected to the high temperature side heat exchanging unit.

10. The system according to claim 9, wherein the driving unit comprises a rotational motion mechanism for causing the magnetic circuit to carry out a rotating motion with respect to the heat exchanger vessel.

11. The system according to claim 9, wherein the driving unit comprises a linear reciprocating motion mechanism for causing the magnetic circuit to carry out a linear reciprocating motion with respect to the heat exchanger vessel.

12. The system according to claim 9, wherein the inside of the heat exchanger vessel is filled with at least two kinds of magnetic particles having a different magnetic transition temperature and layered in a refrigerant flowing direction.

13. The system according to claim 9, wherein the heat exchanger vessel has a multiple helical structure in which a plurality of helical portions are combined, and the helical portions are connected in series in the refrigerant flowing direction.

14. The system according to claim 13, wherein each of the helical portions is filled with magnetic particles having a different magnetic transition temperature.

15. The system according to claim 9, wherein the helical structure has a helical angle of at least 10°.

16. The system according to claim 9, wherein the magnetic particles have a particle diameter of 0.1 mm or more to 2 mm or less and are formed in a spherical shape, and the volume filling ratio of the magnetic particles deposited in the heat exchanger vessel is 40% or more to 70% or less.

17. The device according to claim 1, a pitch of the helical structure of the permanent magnet being the same as that of the heat exchanger vessel.

18. The device according to claim 9, a pitch of the helical structure of the permanent magnet being the same as that of the heat exchanger vessel.

* * * * *